United States Patent [19]

Ely

[11] Patent Number: 4,619,821

[45] Date of Patent: Oct. 28, 1986

[54] OZONE DECOMPOSITION

[75] Inventor: Stephen R. Ely, Naperville, Ill.

[73] Assignee: Amoco Corporation, Chicago, Ill.

[21] Appl. No.: 803,588

[22] Filed: Dec. 2, 1985

[51] Int. Cl.⁴ ............................................. B01D 53/36
[52] U.S. Cl. ..................................... 423/579; 423/219
[58] Field of Search ..................... 423/219, 210 S, 579

[56] References Cited

U.S. PATENT DOCUMENTS

| | | | |
|---|---|---|---|
| 2,980,494 | 4/1961 | Jenkins et al. | 423/210 S |
| 3,012,853 | 12/1961 | Milton | 423/219 |
| 4,101,296 | 7/1978 | Lowther | 423/219 |
| 4,173,549 | 11/1979 | Kent et al. | 423/219 |
| 4,183,728 | 1/1980 | Leitzke et al. | 423/239 |
| 4,206,083 | 6/1980 | Chang | 423/210 S |
| 4,259,299 | 3/1981 | Hagiwara et al. | 502/60 |
| 4,261,863 | 4/1981 | Kent et al. | 423/219 |
| 4,268,420 | 5/1981 | Klotz | 423/277 |
| 4,405,507 | 9/1983 | Carr et al. | 502/327 |
| 4,459,269 | 7/1984 | Zackay et al. | 423/219 |

FOREIGN PATENT DOCUMENTS

| | | | |
|---|---|---|---|
| 1444468 | 11/1970 | Fed. Rep. of Germany | 423/210 S |
| 2537090 | 3/1977 | Fed. Rep. of Germany | 423/210 S |
| 3208545 | 9/1983 | Fed. Rep. of Germany | 423/219 |
| 123187 | 11/1974 | Japan | 423/210 S |
| 80293 | 6/1975 | Japan | 423/210 S |
| 75686 | 6/1977 | Japan | 423/579 |
| 136941 | 8/1982 | Japan | 423/219 |
| 183928 | 10/1983 | Japan | 423/219 |
| 2056424 | 3/1981 | United Kingdom | 423/210 S |

*Primary Examiner*—John Doll
*Assistant Examiner*—Wayne A. Langel
*Attorney, Agent, or Firm*—Maria Tungol; William T. McClain; William H. Magidson

[57] ABSTRACT

A process to decompose ozone comprises passing an ozone-containing gas with a catalyst comprised of an AMS-1B crystalline borosilicate catalyst.

13 Claims, No Drawings

OZONE DECOMPOSITION

BACKGROUND OF THE INVENTION

This invention relates to a process for decomposing ozone by contacting an ozone-containing gas with a catalyst comprising an AMS-1B crystalline borosilicate-based catalyst.

Because of its strong oxidative properties, ozone is used for disinfecting and removing undesirable organic material such as bacteria from waste water, sewage, drinking water, and industrial stack gases. Ozone is generated for use in many chemical processes which require the presence of a strong oxidant. The uses of ozone are described in Kirk-Othmer's, *Encyclopedia of Chemical Technology*, Third Edition, Vol. 16, pp. 683-712, incorporated herein by reference. Unfortunately, ozone is biologically toxic and remains chemically active, even in concentrations of less than 1 ppm. When an ozone-containing gas is released into the atmosphere, the resulting photochemical reaction generates oxidant, thereby causing secondary environmental pollution. The control of ozone is a particular problem in certain situations where ozone is generated or maintained for a long period in an enclosed area (e.g., when it is generated during the operation of equipment such as electronic photocopying machines or found in airplanes flying at high altitudes).

Ozone decomposition processes use different catalytic compositions. Examples of such compositions include an activated carbon-zeolite mixture (U.S. Pat. No. 4,259,299), deposited metallic silver and a composite of zirconia and oxides of manganese (U.S. Pat. No. 4,261,863), and a platinum group metal or compound and a nonprecious Group VIII metal oxide or aluminate (U.S. Pat. No. 4,405,507). A number of catalysts for the decomposition of ozone at room temperature were evaluated by Ellis et al. (*Atmospheric Environment*, Vol. 6, Pergamon Press 1972, pp. 707-714). Among these were charcoal, metals and metal oxides, zeolite catalyst and silica-alumina catalyst. Charcoal and nickel oxide were found to be the best catalysts tested while the zeolite and silica-alumina catalysts were among the least efficient in decomposing ozone. After 15 minutes of contact with a zeolite or silica-alumina catalyst, an air stream containing ozone had only about 0–10% of the ozone removed. In U.S. Pat. No. 4,183,728, aluminosilicates were used to adsorb nitrogen oxides in a gas mixture containing ozone. The reference specifically teaches that the ozone passes over the aluminosilicate without any decomposition. When charcoal is used to decompose ozone, the charcoal mass is consumed during the process. Also, possible dust from a charcoal catalyst would prove inconvenient in the situations involving enclosed areas such as airplanes. Catalytically active metals are susceptible to "poisoning" by gases such as carbon monoxide, ammonia, sulfur dioxide or hydrogen disulfide.

Zeolitic materials, both natural and synthetic, are many times known to have catalytic capabilities. Zeolitic materials typically are ordered porous crystalline aluminosilicates having a definite structure with cavities interconnected by channels. The cavities and channels throughout the crystalline material generally are uniform in size, allowing selective separation of hydrocarbons. Consequently, in many instances these materials are known in the art as "molecular sieves" and are used, in addition to selective adsorptive processes, for certain catalytic properties. The catalytic properties of these materials are affected to some extent by the size of the molecules which selectively penetrate the crystal structure, presumably to contact active catalytic sites within the ordered structure of these materials.

Boron is not considered a replacement for aluminum or silicon in a zeolitic composition. However, recently a new crystalline borosilicate molecular sieve AMS-1B with distinctive properties was disclosed in U.S. Pat. Nos. 4,268,420 and 4,269,813, incorporated by reference herein. According to these patents, AMS-1B can be synthesized by crystallizing a source of an oxide of silicon, an oxide of boron, an oxide of sodium, and an organic template compound such as a tetra-n-propyl ammonium salt. The process of this invention uses AMS-1B crystalline borosilicate molecular sieve.

It is a general object of this invention to provide an effective, convenient method of treating an ozone-containing gas to decompose the ozone. More particularly, it is an object to provide a method that utilizes a high efficiency catalyst which operates at room temperature and does not have sites subject to poisoning. Other objects of the invention appear hereinafter.

SUMMARY OF THE INVENTION

A process to decompose ozone comprises passing an ozone-containing gas through an AMS-1B crystalline borosilicate catalyst.

DESCRIPTION OF THE INVENTION

This invention is a method to decompose ozone by contacting an ozone-containing gas with a catalyst comprised of an AMS-1B crystalline borosilicate-based catalyst. More particularly, this invention is a method to decompose ozone by contacting an ozone-containing gas with a catalyst comprised of the hydrogen form of an AMS-1B crystalline borosilicate-based catalyst.

In the process of this invention, a gaseous stream is passed through an AMS-1B crystalline borosilicate-based catalyst thereby providing an efficient method of reducing or totally destroying the ozone in said stream. Gases which can be treated by the process of this invention can contain about 0.01 vol. % to about 20 vol. % ozone and typically contain about 0.1 vol. % to about 5 vol. % ozone.

In this process ozone may be converted entirely to other molecules such as oxygen or may be partially converted. Thus, depending upon the required maximum ozone concentration of exit gas, process conditions may be chosen to effect a desired conversion level. Typically, higher temperatures and lower space velocity result in lower ozone exit gas concentrations. Typically, in the process of this invention, ozone concentration of the exit gas has been reduced by at least 50%, preferably 90%, compared to the initial gas stream. Reduction of above 99% in ozone concentration can be obtained in many instances.

In the process of this invention, ozone-containing gas should be in continuous contact with the catalyst. Typically, this is accomplished by passing ozone-containing gas through a bed of catalyst material, although equivalent methods could be used. This is opposed to mere contact of air with a static bed of catalyst. Increasing contact of the gas with the surface area of the catalyst is expected to increase the amount of ozone which is decomposed.

Typical process conditions suitable in this invention include a reaction temperature ranging from about −110° C. to below the thermal decompositin temperature of ozone. Typically, reaction temperature ranges from about −20° to about 125° C. and preferably from about 0° to about 100° C. Typically, the process of this invention may be performed at ambient temperature, usually about 25° C. Operating pressure is chosen to maximize conversion and can range from about 0.1 atmosphere up to 10 atmospheres or above, typically about 0.9 to about 2 atmospheres and preferably is normal atmospheric pressure. Volume hourly space velocity (volume unit of feed per hour per volume unit of catalyst) can range from about 0.1 hr$^{-1}$ to about 4,000 hr$^{-1}$, typically about 0.5 hr$^{-1}$ to about 1,200 hr$^{-1}$ and preferably about 1 hr$^{-1}$ to about 350 hr$^{-1}$.

The catalyst useful in this invention is based on the crystalline borosilicate molecular sieve, AMS-1B, described in U.S. Pat. Nos. 4,268,420 and 4,269,813, incorporated herein by reference. A particularly useful catalyst for this invention contains the hydrogen form of AMS-1B.

The catalyst system which is useful in this invention comprises a borosilicate catalyst system based on a molecular sieve material identified as AMS-1B. Details as to the preparation of AMS-1B are described in U.S. Pat. No. 4,269,813 and European Published Application No. 68,796. Such AMS-1B crystalline borosilicate generally can be characterized by the X-ray pattern listed in Table 1 and by the composition formula:

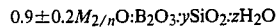

$$0.9 \pm 0.2 M_{2/n}O:B_2O_3:ySiO_2:zH_2O$$

wherein M is at least one cation, n is the valence of the cation, y is between 4 and about 600, and z is between 0 and about 160.

TABLE 1

| d-Spacing A[1] | Assigned Strength[2] |
|---|---|
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |
| 1.99 ± 0.02 | VW-M |

[1]Copper K alpha radiation
[2]VW = very weak; W = weak; M = medium; MS = medium strong; VS = very strong The AMS-1B borosilicate molecular sieve useful in this invention can be prepared by crystallizing an aqueous mixture, at a controlled pH, of sources for cations, an oxide of boron, an oxide of silicon, and an organic template compound.

Typically, the mole ratios of the various reactants can be varied to produce the crystalline borosilicates of this invention. Specifically, the mole ratios of the initial reactant concentrations are indicated below:

|  | Broad | Preferred | Most Preferred |
|---|---|---|---|
| $SiO_2/B_2O_3$ | 5–400 | 10–150 | 10–80 |
| $R_2O+/[R_2O- + M_{2/n}O]$ | 0.1–1.0 | 0.2–0.97 | 0.3–0.97 |
| $OH-/SiO_2$ | 0.01–11 | 0.1–2 | 0.1–1 |
| $H_2O/OH-$ | 10–4,000 | 10–500 | 10–500 | wherein R is an organic compound and M is at least one cation having a valence n, such as an alkali metal or an alkaline earth metal cation. By regulation of the quantity of boron (represented as $B_2O_3$) in the reaction mixture, it is possible to vary the $SiO_2/B_2O_3$ molar ratio in the final product.

More specifically, the material useful in the present invention is prepared by mixing a cation source compound, a boron oxide source, and an organic template compound in water (preferably distilled or deionized). The order of addition usually is not critical although a typical procedure is to dissolve sodium hydroxide and boric acid in water and then add the template compound. Generally, after adjusting the pH, the silicon oxide compound is added with intensive mixing such as that performed in a Waring Blendor. After the pH is checked and adjusted, if necessary, the resulting slurry is transferred to a closed crystallization vessel for a suitable time. After crystallization, the resulting crystalline product can be filtered, washed with water, dried, and calcined.

Examples of oxides of silicon useful in this invention include silicic acid, sodium silicate, tetraalkyl silicates, and Ludox, a stabilized polymer of silicic acid manufactured by E. I. duPont de Nemours & Co. Typically, the oxide of boron source is boric acid although equivalent species can be used such as sodium borate and other boron-containing compounds.

Cations useful in formation of AMS-1B include alkali metal and alkaline earth metal cations such as sodium, potassium, lithium, calcium, and magnesium. Ammonium cations may be used alone or in conjunction with such metal cations. Since basic conditions are required for crystallization of the molecular sieve of this invention, the source of such cations usually is a hydroxide such as sodium hydroxide. Alternatively, AMS-1B can be prepared directly in the hydrogen form by replacing such metal cation hydroxides with an organic base such as ethylenediamine.

Organic templates useful in preparing AMS-1B crystalline borosilicate include alkylammonium cations or precursors thereof such as tetraalkylammonium compounds. An example of an organic template is tetra-n-propyl ammonium bromide. Diamines, such as hexamethylenediamine, can be used.

The resulting crystalline product can be separated and recovered by well-known means such as filtration with washing. This material can be mildly dried from a few hours to a few days at varying temperatures, typically about 25°–200° C., to form a dry cake which can be crushed to a powder or to small particles and extruded, pelletized, or made into forms suitable for its intended use. Typically, the mildly dried product is calcined at temperatures ranging from about 260° to about 850° C., and preferably from about 525° to about 600° C. Extreme calcination temperatures or prolonged crystallization times may prove detrimental to the crystal structure or may totally destroy it. Generally, there is no need to raise the calcination temperature beyond about 600° C. in order to remove organic material from the originally formed crystalline material. Typically, the molecular sieve material is dried in a forced draft oven at 165° C. for about 16 hours and is then calcined in air in a manner such that the temperature rise does not exceed 125° C. per hour until a temperature of about 540° C. is reached. Calcination at this temperature usually is continued for about 4 to 16 hours.

The original cation in the AMS-1B crystalline borosilicate, which usually is a sodium ion, can be replaced all or in part by ion exchange with other cations including alkylammonium ions, ammonium ions, hydrogen ions, and mixtures thereof. Preferred replacing cations are those which render the crystalline borosilicate catalytically active, especially for ozone decomposition. The preferred replacing cation is hydrogen. Ion exchange techniques are well-known in the art. Typically, an aqueous solution of a cationic species is exchanged one or more times at about 25° to about 100° C. The hydrogen form of the borosilicate-based catalyst is the preferred in the process of this invention.

The hydrogen form of the borosilicate is typically produced by an exchange one or more times with ammonium ions, typically using ammonium acetate followed by drying and calcination as described above. The borosilicate is converted into the hydrogen form by the calcination. Alternatively, the hydrogen form of the borosilicate which is directly produced by the process according to Published European Application No. 68,796 can be used in the process of this invention. The hydrogen form of the borosilicate catalyst will be called HAMS-1B in the following examples and claims.

The AMS-1B crystalline borosilicate useful in this invention admixed with or incorporated within various binders or matrix materials is disclosed in U.S. Pat. No. 4,433,190, incorporated herein by reference. The crystalline borosilicate can be combined with active or inactive materials, synthetic or naturally-occurring zeolites, as well as inorganic or organic materials which would be useful for binding the borosilicate. Well-known materials include silica, silica-alumina, alumina, magnesia, titania, zirconia, alumina sols, hydrated aluminas, clays such as bentonite or kaoline, or other binders well-known in the art. Typically, the borosilicate is incorporated within a matrix material by blending with a sol of the matrix material and gelling the resulting mixture. Also, solid particles of the borosilicate and matrix material can be physically admixed. Typically, such borosilicate compositions can be pelletized or extruded into useful shapes. The crystalline borosilicate content can vary anywhere from a few wt. % up to 80 wt. % of the total composition. Catalytic compositions can contain about 1 wt. % to about 80 wt. % crystalline borosilicate material and preferably contain about 35 wt. % of such material. Preferably, the catalyst used in this invention is incorporated in an alumina or silica-alumina matrix.

Catalytic compositions comprising the crystalline borosilicate material of this invention and a suitable matrix material can be formed by adding a finely-divided crystalline borosilicate to an aqueous sol or gel of the matrix material. The resulting mixture is thoroughly blended and gelled typically by adding a material such as ammonium hydroxide. The resulting gel can be dried and calcined to form a composition in which the crystalline borosilicate is distributed throughout the matrix material. Alternatively, the borosilicate in a finely divided state can be mixed with the matrix material to form a mixture suitable for extrusion. After the mixture is extruded, it is dried and then calcined to provide a calcined catalytic composition.

Specific details of catalyst preparations are described in U.S. Pat. Nos. 4,268,420 and 4,269,813.

This invention is demonstrated but not limited by the following Examples.

EXAMPLE 1

About 87.5 grams of an HAMS-1B borosilicate and about 100 milliliters of water were dispersed in 1,675.3 grams of a PHF-alumina hydrosol (9.7% solids) obtained from American Cyanamid Co. and mixed thoroughly. The hydrosol-borosilicate blend was gelled by the addition of 244 milliliters of a concentrated ammonium hydroxide solution (28–30 wt. % NH$_4$OH). Mixing was continued for 5 minutes. The resulting gel was dried overnight at a temperature of 130° C. in a forced draft drying oven. The dried material was calcined at 538° C. then ground to less than 100 mesh in a mill. About 0.80 grams of polyvinyl alcohol (an extrusion aid) in 500 grams of water were added to the ground material and then mixed. The mixture was then placed in a muller and mixed with the addition of distilled water until it had a consistency suitable for extrusion. The material was then extruded through a 1/16-inch die plate and dried at 130° C. The dried extrudate was calcined at 537° C. for 12 hours.

A tower having an inside diameter of about 1.5 inches and a height of about 6 inches was built from 29/42 inner and outer joints. A 40 mesh stainless steel screen was placed in the bottom of the inner joint followed by 13.72 grams of an HAMS-1B borosilicate material made by the process of Example 1. The resulting bed of catalyst was about 3 to 4 inches high. Air containing 1.2% ozone (by volume) was passed through the tower at a rate of 120 cc/minute. The volume percent of ozone was determined by bubbling the gas to be analyzed into a 2% by weight potassium iodide solution for 3 to 5 minutes. The iodine formed was then titrated with a 0.01 N solution of sodium thiosulfate (Na$_2$S$_2$O$_3$) to a starch endpoint. The percent ozone was determined by the following formula:

$$\frac{(cc\ Na_2S_2O_3)(Molarity\ Na_2S_2O_3) \times 0.5^a \times 25.1^b \times 100}{seconds\ of\ testing \times (flow\ of\ gas\ in\ cc/sec.)}$$

$^a$mmole ozone/mmole Na$_2$S$_2$O$_3$
$^b$cc of gas/mmole ozone at 298° K. at a pressure of 740 mm After 20 minutes, the ozone content of the air exiting the tower was measured; there was no detectable ozone in the air. After 3 hours, about 0.05% ozone was measured in the exit air and after 5 hours, 0.03% ozone was measured.

COMPARATIVE EXAMPLE

The process of Example 1 was repeated to treat air containing 1.4% ozone and using 14.2 grams of a commercially available alumina extrudate in place of the HAMS-1B catalyst composition. The exit air contained 1.2% ozone after 2 minutes and remained at about that level indicating that there was no further decomposition of ozone.

EXAMPLE 2

Nine grams of a formulated catalyst containing 20% HAMS-1B and 80% Al$_2$O$_3$ sieve which had been calcined at 1000° C. overnight were placed in a glass column. A gas stream containing about 0.304% ozone was passed through the column at atmospheric pressure at a rate of about 467 cc/minute. After 90 minutes, the outlet gas contained about 0.001% ozone and after 4.5 hours, 0.015% ozone was measured.

What is claimed is:

1. A process to decompose ozone which comprises passing an ozone-containing gas through a catalyst comprised of an AMS-1B crystalline borosilicate catalyst.

2. A process according to claim 1 wherein the AMS-1B crystalline borosilicate catalyst is comprised of HAMS-1B borosilicate.

3. A process according to claim 1 wherein said gas contains from about 0.01 vol. % to about 20 vol. % ozone prior to contact with said catalyst.

4. A process according to claim 3 wherein said gas contains from about 0.1 vol. % to about 5 vol. % ozone prior to contact with said catalyst.

5. A process according to claim 1 wherein the said gas is passed through said catalyst at ambient temperature.

6. A process according to claim 1 wherein the said gas is passed through said catalyst at about 25° C.

7. A process according to claim 1 wherein the AMS-1B crystalline borosilicate-based catalyst is incorporated within a matrix material.

8. A process according to claim 7 wherein the AMS-1B borosilicate content in the matrix ranges from about 1 to 80% by weight of the resulting catalyst.

9. A process according to claim 8 wherein the AMS-1B borosilicate content in the matrix is about 35% by weight of the resulting catalyst.

10. A process according to claim 7 wherein the AMS-1B borosilicate content in the matrix is about 20% by weight of the resulting catalyst.

11. A process according to claim 7 wherein said matrix material comprises alumina, silica, or silica-alumina.

12. A process according to claim 11 wherein said matrix material comprises alumina or silica-alumina.

13. A process according to claim 1 wherein said catalyst consists essentially of an HAMS-1B crystalline borosilicate catalyst incorporated within alumina.

* * * * *